United States Patent [19]

Matulich

[11] Patent Number: 4,869,581
[45] Date of Patent: Sep. 26, 1989

[54] DEFLECTOR TO CLEAN DEBRIS FROM AUTOMOTIVE REARVIEW MIRRORS

[76] Inventor: Robert A. Matulich, 8801 Ravenna Ave., N.E., Seattle, Wash. 98115

[21] Appl. No.: 209,585

[22] Filed: Jun. 21, 1988

[51] Int. Cl.⁴ .......................... G02B 5/00; B60R 1/06
[52] U.S. Cl. .................................... 350/584; 350/582
[58] Field of Search ............... 350/584, 582; 296/91

[56] References Cited

U.S. PATENT DOCUMENTS

| | | | |
|---|---|---|---|
| 2,796,506 | 6/1957 | Lumbert | 350/584 |
| 3,455,624 | 7/1969 | Godfrey | 350/584 |
| 3,859,899 | 1/1975 | Mills | 350/584 |
| 4,037,079 | 7/1977 | Armbruster | 350/584 |
| 4,200,359 | 4/1980 | Lawson | 350/627 |
| 4,577,929 | 3/1986 | Guillen | 350/584 |

FOREIGN PATENT DOCUMENTS

| | | | |
|---|---|---|---|
| 0089245 | 5/1984 | Japan | 350/584 |
| 1020576 | 2/1966 | United Kingdom | 350/584 |
| 1515934 | 6/1978 | United Kingdom | 350/584 |
| 2175552 | 12/1986 | United Kingdom | 350/584 |

*Primary Examiner*—Bruce Y. Arnold
*Assistant Examiner*—Shafer R. D.

[57] ABSTRACT

A scoop-type deflector is disclosed to releasably fit at the top of a rearview automotive mirror to deflect air over the rearward facing mirror surface to clean it. The scoop provides means for releasable attachment to the mirror, a venturi structure to increase velocity of airflow over the mirror surface, and a deflector bar to aid in preventing debris, and especially insects in the incoming air, from contaminating the mirror surface.

6 Claims, 1 Drawing Sheet

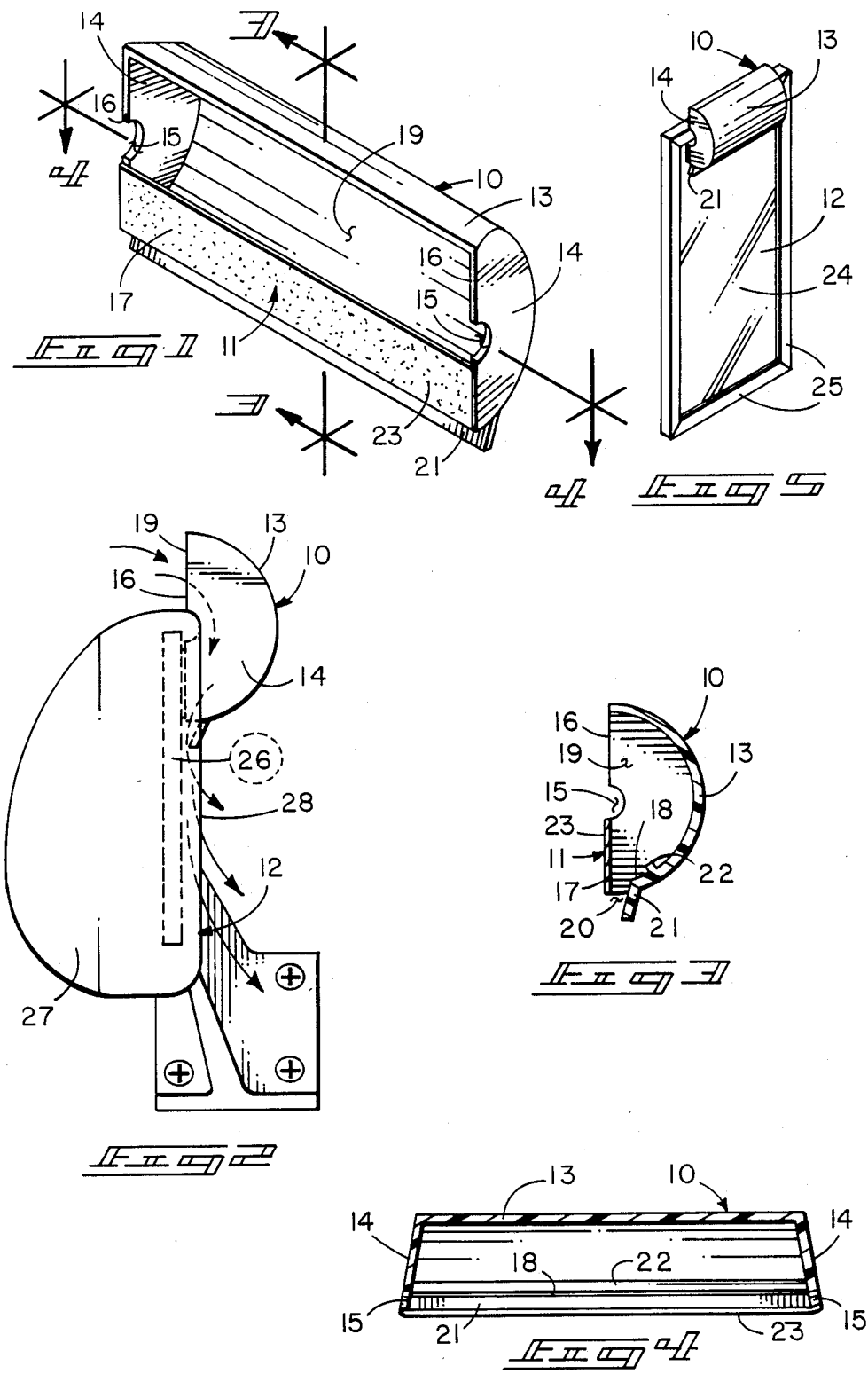

DEFLECTOR TO CLEAN DEBRIS FROM AUTOMOTIVE REARVIEW MIRRORS

BACKGROUND OF INVENTION

Related Applications

There are no applications related hereto heretofore filed in this or any foreign country.

Feild of Invention

My invention relates generally to air deflectors to clean rearview automotive mirrors and more particularly to a releasably attachable deflector that provides a venturi action.

BACKGROUND AND DESCRIPTION OF PRIOR ART

Rearview mirrors for automotive use have become a standard component of modern vehicular structures and in some geographic areas are a structure required by law to be present on such vehicles. These mirrors, to serve their purposes, must project laterally outward from the outer surface of a vehicle and, though their reflective surfaces face rearwardly, those surfaces are of necessity substantially unprotected and tend to accumulate debris of various sorts. Such debris may accumulate at any time to tend to lessen or prevent the effective use of such mirrors by a vehicle operator to frustrate the mirror purpose. The debris may be relatively difficult to remove, especially while a vehicle is being operated. Responsive to these problems, various devices to clean or aid in cleaning the surface of such rearview mirrors have heretofore become known. The instant invention seeks to provide a new and novel member of this class of device.

Rearview mirrors have evolved into two general classes, a first embodying relatively simple mirrors with utilitarian mountings of a general rectilinear nature for use on commercial vehicles and a second class embodying complex mirrors carried in fairly extensive curvilinear shaped housings with various adjustment mechanism for use in ordinary non-commercial passenger vehicles. Since scoop-type cleaning devices have not become standardized for use with rearview mirrors and are generally not provided by a manufacturer, a cleaning device to be most useful must be usable upon various types of existing mirrors. My invention provides such a structure firstly, by providing a scoop that may be rather universally attached to the upper portion of a mirror by means of a releasable adhesive joinder and secondarily, the scoop is so configured that it fits upon most present day mirrors, of either the commercial or non-commercial type, by reason of its particular exterior configuration and the positioning and nature of its adhesive fastening member. Most prior art devices performing similar functions have in general either been embodied within a complex housing structure of a mirror, to require placement at the time of manufacture, or have required some particularized fastening structure that necessitated mechanical modification of existing mirrors for attachment with resultant defacing and required services of a skilled mechanic for installation. Prior art devices in general have not been releasably positionable nor so universally usable.

My deflector further is positioned at the top of a mirror to divert air vertically downwardly over that mirror's rearward reflective surface, in distinguishment from prior art devices which commonly have moved diverted air across the mirror surface either from a mirror's sides or about its complete periphery. The air motion of prior art devices is not so effective as in my device as there tends to be substantially more turbulence along the lateral sides of automotive mirrors that tends to lessen the effects of air streams moving in this direction substantially more than for air streams moving vertically downwardly thereover. Such air motion is caused largely by the non-symmetrical array of other objects laterally of a rearview mirror, which is not the case in the vertical direction where air tends to flow more in a streamlined fashion over a mirror's upper and lower edges.

My invention also provides a venturi effect for the air it uses in its cleaning action to disperse that air at a higher velocity than the velocity at which air enters the device. This is accomplished by providing an input orifice substantially larger than the output orifice, while yet maintaining flow through the device in a substantially streamlined fashion. This increased velocity of the cleaning air provides a substantial advantage over prior art devices that generally have moved the airflow that they direct at substantially the same or lower velocity than that at which it enters the deflecting structure.

My invention also provides a bar-like deflector inwardly adjacent its output orifice to tend to prevent debris in cleaning air from being deposited upon the mirror surface being cleaned. This is especially true of insects or their body parts and other objects of a similar consistency. I accomplish this function by diverting the input air in a curvilinear course between its input and output orifices and provide bar means along the larger radial surface, where such debris as insect bodies will tend to move by reason of centrifugal force, so that it will strike the bar and either tend to be entrapped on that structure or be broken by it into small pieces which do not tend to accumulate on a mirror's surface to there create further debris. Prior art devices in general have not provided such a feature and if the air serving to clean a mirror contained debris, that debris commonly has been deposited on the rearward facing mirror surface, oftentimes with substantial force. In prior art devices, this is especially a problem with insect bodies and their parts.

My invention does not reside in any one of these features per se, but rather in the synergistic combination of all of the structures giving rise to them that produce the functions necessarily flowing therefrom as hereinafter more fully specified and claimed.

SUMMARY OF INVENTION

My invention generally provides a peripherally defined deflector in the form of a half circular cylinder with ends. A larger input orifice is defined, parallel to the cylinder axis and extending inwardly from a first edge of the cylindrical periphery, on the flat side and a smaller output orifice is defined in the axially opposed curvilinear periphery of the cylinder adjacent the second cylindrical edge. The portion of the flat side of the structure adjacent the input orifice provides an adhesive surface which may be adhered to the rearward facing surface of a mirror to releasably position the deflector thereon. The output orifice carries a deflector to direct output air onto a rearward mirror surface and defines an internal debris bar on the curvilinear peripheral surface immediately inwardly adjacent the output orifice to catch and break up debris in air passing through the deflector channel. The ends of the cylindrical body may be angled to increase venturi action and define indentations in their medial portions to allow the deflector to fit upon various existing mirror structures.

In providing such a device it is:

A principal object of my invention to create an auxiliary scoop-type deflector that is releasably attachable to the rearward facing surface of an automotive rearview mirror to direct airflow passing the mirror's periphery over that rearward facing mirror surface.

A further object of my invention to provide such a deflector that is positionable at the top of a mirror to direct airflow downwardly over such mirror surface to provide efficient streamlined airflow to more effectively clean the mirror surface than would airflow from any other direction.

A still further object of my invention to provide such a deflector that has an input orifice of substantially greater area than its output orifice, so that the velocity of air exiting the device to clean a mirror is greater than the velocity of the air entering the device.

A still further object of my invention to provide such a deflector that directs air in a streamlined fashion about a curvilinear course in presenting it to clean a mirror and provides a debris bar adjacent the output orifice on the side of greatest curvature of the air directing channel to catch and break up debris in air passing through the device.

A still further object of my invention to provide such a deflector that is peripherally defined by a particularly configured structure to allow attachment on various types of rearview mirrors of modern day commerce.

A still further object of my invention to provide such a deflector that is of new and novel design, of rugged and durable nature, of simple and economical manufacture and otherwise well suited to the uses and purposes for which it is intended.

Other and further objects of my invention will appear from the following specification and accompanying drawings which form a part hereof. In carrying out the objects of my invention, however, it is to be understood that its essential features are susceptible of change in design and structural arrangement with only one preferred and practical embodiment being illustrated in the accompanying drawings as is required.

BRIEF DESCRIPTION OF DRAWINGS

In the accompanying drawings which form a part hereof and wherein like numbers of reference refer to similar parts throughout:

FIG. 1 is an isometric view of the forward facing surface of my invention showing its various parts, their configuration and relationship.

FIG. 2 is an isometric view of the device of FIG. 1 mounted upon a typical rearview mirror structure of a passenger car of present day commerce.

FIG. 3 is a vertical transverse cross-sectional view of the device of FIG. 1, taken on the line 3—3 thereon in the direction indicated by the arrows.

FIG. 4 is an elongate horizontal cross-sectional view of the device of FIG. 1, taken on the line 4—4 thereon in the direction indicated by the arrows.

FIG. 5 is an isometric view, taken from the rear and looking forwardly, to show my invention mounted on a typical mirror of common commercial type vehicles of present day commerce.

DESCRIPTION OF THE PREFERRED EMBODIMENT

My invention generally provides deflector 10 having fastening means 11 for releasable attachment to the upper portion of automotive rearview mirror 12.

Deflector 10 is a peripherally defined element geometrically configured as a diametrical half of a circular cylinder that is carried on the top portion of a mirror with its axis substantially parallel to the top portion of the mirror. Peripheral cylindrical element 13 structurally joins half circular planar end elements 14 in each of its end portions. In the instance shown the ends slope inwardly toward each other as they extend away from the flat side of the deflector to enhance the venturi action of the device.

The shape of element 13 in the instance illustrated is that of a ruled surface that would constitute part of the peripheral surface of a right circular cylinder and though this configuration is preferred, various other similar configurations that define a channel turning through approximately a 180 degree angle are within the scope of my invention. The end elements define indentations 15 in their medial parts about the cylindrical axis of the deflector to allow those end elements to fit over a peripheral protruding rim common in many modern day mirror structures. This indentation normally will be of circular configuration, as illustrated, though other shapes to accommodate particular mirror frames are within the ambit and scope of my invention. The two end portions 14 define linear inner edges 16 which constitute diameters of a circular section forming a cross-sectional element of a cylinder of which element 13 forms the peripheral surface.

Planar fastening element 17 extends upwardly from the lower edge 18 of peripheral element 13 and between the lower portions of end edges 16, to a position below frame indentations 15, to define forward input orifice 19 in the upper part of the deflector face. The lower rearward portion of peripheral cylindrical element 13 defines slot-like output orifice 20, in the instance illustrated, comprising an elongate rectilinear orifice extending between end elements 14. Normally the area of input orifice 19 should be substantially greater, by a factor of approximately five, than the area of the output orifice to provide appropriate velocity to to air deflected through the channel of my device. Lower edge 18 of the peripheral element carries downwardly and forwardly extending lip 21 to direct airflow through the output orifice at a slight angle toward an adjacent mirror surface that the deflector is mounted upon.

Immediately upwardly adjacent lower edge 18, the inner surface of peripheral cylindrical element 13 structurally carries debris bar 22, in the instance illustrated, comprising a ledge of rectilinear configuration extending radially inwardly between the inner surfaces of the end elements. This bar in the instance illustrated projects inwardly from element 13 a distance of approximately 3/16th of an inch. The sizing and inward projection of this bar are somewhat critical to the functioning of my deflector, as if the bar be too large or project too far inwardly it will disturb the streamline flow of air through my deflector and on the other hand, if it not be large enough or not project far enough inwardly, it will not serve its purpose of stopping or breaking up debris passing through the deflector. Debris carried by input air will generally constitute some sort of particulate matter having a density substantially greater than the air carrying it, so that as the carrying air passes in a curvilinear pattern through the channel of my deflector, the greater mass of the debris will cause it to move, by reason of centrifugal forces upon it, to the outside of the curved pathway where it impacts upon debris bar 22 to either be there retained or broken up into smaller particles, depending upon particular parameters of the deflector and the nature of the debris and its impact.

The configuration of my deflector is substantially constrained to the essence of that specified, though its relative dimensions may vary to accommodate particular conditions and particular mirrors. The deflector of necessity must be formed of some rigid material that is reasonably durable and preferably relatively inexpensive. An ideal material fitting these requirements is one of the harder, more dense, moldable polymeric or resinous plastics of present day commerce. With such materials, I prefer to unitarily form the entire deflector structure described by injection molding to alleviate the necessity of having to mechanically join various elements of the structure described. The deflector obviously, however, may be created by forming and assembling its individual elements and if so, mechanical joinder of adjacent communicating surfaces of those elements is accomplished according to methods heretofore known for the joinder of the particular materials involved. Normally the length of my deflector, that is the distance between its ends, will be approximately five inches and normally its depth, that is the length of the diameter of a circle defining a cross-section of a cylinder of which element 13 is a periphery, will be approximately 1.75 inches. The dimensions of other elements of the structure will be approximately proportional to the proportions indicated in the illustrations.

Fastening means 11 provides means for fastening the forwardly facing surface of fastening element 17 to the surface of an adjacent mirror to be serviced. This fastening is accomplished by one of the contact adhesives of present day commerce and again preferably the fastening is of a releasable nature such as results from use of one of the so-called "contact" adhesives. The only requirement of my invention, however, is that the structure be fastened in appropriate position upon a mirror and other and different methods of accomplishing this end remain within the spirit and scope of my invention. Fastening with rigid mechanical fasteners, however, is cumbersome and is not only difficult to accomplish with present day mirrors, but also causes permanent structural disfiguration of such mirrors to make releasable adhesive fastening the only practical method.

A convenient process to establish adhesive between the face of fastening element 17 and a mirror to be serviced is by use of so-called "two-sided" adhesive tape which comprises a strip of some supportive material with a contact-type adhesive coated on both sides. Such tape may be conveniently applied, by fastening firstly to element 17 and then fastening the deflector to a mirror.

Having described the structure of my invention, its use may be understood.

Firstly, a deflector is formed according to the foregoing specification and as illustrated. After formation, the device is applied to a mirror, as shown in FIGS. 2 and 5. Commonly when merchandized, the adhesive on fastening element 17 will be provided with some sort of a releasable cover (not shown) and if so, that cover is removed for deflector placement.

Most rearview mirror structures 12 of the present day provide either a planar mirror 24 with simple peripheral frame 25, as illustrated in FIG. 5 and as commonly used in commercial vehicles, or a movable mirror element 26 mounted in a larger complex housing 27, commonly for adjustable movement, with peripheral rim portion 28 of the housing projecting somewhat rearwardly of the rearward mirror surface. The latter structure is most commonly seen in present day passenger cars. Either structure, however, commonly provides some sort of a peripheral element which projects rearwardly beyond a mirror surface. The commercial-type mirror is commonly mounted by some type of side mounting structure associated with one or both of its vertical edges and the passenger car structure has mounting means exteriorly of housing 27 which most generally project downwardly from the mirror housing.

For attachment, my deflector structure is manually positioned adjacent the upper, rearward facing portion of a mirror to be serviced and manually moved to properly position it so that input orifice 19 will be facing forwardly and projecting above the mirror housing's upper edge and frame indentations 15 of the ends of the deflector will be positioned about frame 25 or peripheral rim 28, as the case may be, of the mirror to be serviced. The deflector then is moved toward the mirror surface until adhesive 23 on fastening element 17 contacts that surface and appropriate pressure is applied and maintained, if required, to cause adhesion of these adjacent elements. The device then will be operatively attached to the mirror, with its input orifice facing forwardly toward the forward direction of travel of the mirror and extending above the mirror to allow input of air therethrough. The exit orifice of the deflector will be adjacent the rearward mirror surface and air exiting therethrough will be directed toward and over that mirror surface by deflector 10.

With the deflector fastened on a rearview mirror in this position, its operation thereafter is automatic upon motion of the vehicle. As the carrying vehicle moves in a forward direction, air from the ambient atmosphere passes through input orifice 19 and through the deflector channel, somewhat as illustrated by the arrows in FIG. 2, to exit through output orifice 20. The air input is enhanced by the mirror housing structure itself, as that structure when moving through the air creates a resistance and forces air forwardly of it rearwardly about its periphery to provide an airflow of higher velocity about the periphery of the mirror structure than would exist were that structure not present.

As the air enters the deflector channel, it will move in a curvilinear course as its rearward flow will be deflected progressively downwardly by the interior surface of peripheral cylindrical element 13. Since the input orifice is already larger than the output orifice, airflow through that output orifice will necessarily be at an increased velocity above the velocity of input. This increased air velocity, coupled with the action of deflector 21, will cause the output air to move upon and across the rearward reflecting surface of a mirror with some substantial velocity to aid in removing debris from the mirror. This is especially true of moisture in a physical form such as rain, snow and the like or moisture in a condensed form that has collected on the mirror surface. Dust or other similar smaller particulate debris will also tend to be removed more or less depending upon its size, the nature of its adherence to the mirror surface, static electric forces and the like.

As air moves through the course of my deflector, it may itself carry particulate debris of various sorts and especially insects and their body parts. Such debris will generally have a substantially higher density than the density of the air moving through the deflector channel and since the course of motion through the deflector is curvilinear, the heavier and more dense debris will tend to move by reason of centrifugal force to the rearward periphery of the air course against the inner surface of peripheral element 13 where the curvature is least. As that debris moves along that course, it ultimately will contact debris bar 22 and generally will impact thereon with some physical force which, commonly in the case of softer, loosely coherent material such as insects or their body parts, will tend to remain on that debris bar. If the material is not retained by the debris bar, it quite often will be fragmented into smaller particles that will tend to exit the deflector with sufficient velocity that they will pass over the surface of a mirror being serviced rather than being retained thereon. In a deflector not having such a debris bar, various debris that may be in the air that is used to clean the mirror surface will tend to collect upon that mirror surface and this is especially true of insects and globules of water, such as raindrops, snow or the like.

It is to be noted that by reason of the particular configuration of my deflector, it may be quite universally applied to many of the various mirror structures of present day commerce as an auxiliary or add-on element that requires no reconfiguration for attachment and causes no disfiguration of existing mirrors. The device further is releasably attachable so that it may be used and reused on various mirrors.

It is further to be noted that although my deflector is primarily designed and used to deflect air from the upper portion of a mirror over the mirror surface, it may by reason of its structure and nature be applied elsewhere about the periphery of a mirror, as on its sides or bottom portion, to perform the same function, though generally not so efficiently.

The foregoing description of my invention is necessarily of a detailed nature so that a specific embodiment of it might be set forth as required, but it is to be understood that various modifications of detail, rearrangement and multiplication of parts might be resorted to without departing from its spirit, essence or scope.

Having thusly described my invention, what I desire to protect by Letters Patent and

What I claim is:

1. A releasable deflector structure for attachment to a rearview mirror of an automotive vehicle to direct airflow from the periphery of the mirror over its reflective surface to aid in cleaning its rearward mirror surface, comprising, in combination:

a peripherally defined deflector having an elongate curvilinear peripheral element and an elongate planar fastening element extending between similar ends to define an elongate half cylinder-like channel for airflow with a larger elongate input orifice and a smaller elongate output orifice to direct output air at an angle greater than 90 and less than 180 degrees from the direction of air input; and a debris bar carried by and projecting inwardly from the inner surface of the curvilinear peripheral element spaced adjacent the output orifice.

2. The invention of claim 1 further characterized by the ends defining similar frame indentations in their medial portions to fit about the rim of a mirror carrying the deflector.

3. The invention of claim 1 further characterized by the fastening element having adhesive material on its outer surface to releasably fasten the fastening element to the surface of a mirror.

4. The invention of claim 3 further characterized by an elongated inwardly projecting debris bar carried by the inner surface of the peripheral element spaced adjacent its lower edge.

5. The invention of claim 3 carried on the surface of an automotive rearview mirror with the fastening element immediately adjacent the rearward mirror surface, the mirror periphery carried in indentations defined in the ends, and the input orifice extending outwardly beyond the mirror in a forward facing direction so that air is directed from the output orifice to and over the face of the mirror to clean it.

6. A releasable deflector for attachment to a rearview mirror of an automotive vehicle to deflect air flow from of the periphery of the mirror over its reflective surface to aid in cleaning its rearward mirror surface, comprising, in combination:

an elongate sheet-like curvilinear peripheral element;

two similar end elements structurally attached to each end of the curvilinear peripheral element to define a peripheral element having a upper and lower portion and defining medial frame indentations to fit over a mirror periphery;

a planar fastening element positioned between the end elements and attached to the lower portion of the peripheral element to define a larger input orifice in the upper portion of the deflector structure;

a smaller elongate output orifice defined between the lower edge of the fastening element and the adjacent curvilinear peripheral element, the lower edge of the peripheral element comprising an angled deflector plate to direct airflow; and the outer surface of the fastening element having adhesive means for releasable attachment to the surface of a mirror; an elongated inwardly projecting debris bar carried by the inner surface of the peripheral element spaced adjacent it lower edge.

* * * * *